(12) United States Patent
Iwai et al.

(10) Patent No.: US 6,852,178 B2
(45) Date of Patent: Feb. 8, 2005

(54) METHOD FOR PROPAGATING VIBRATORY MOTION INTO A CONDUCTIVE FLUID AND USING THE METHOD TO SOLIDIFY A MELTED METAL

(75) Inventors: Kazuhiko Iwai, Nagoya (JP); Shigeo Asai, Nagoya (JP)

(73) Assignee: Nagoya University, Nagoya (JP)

( * ) Notice: Subject to any disclaimer, the term of this patent is extended or adjusted under 35 U.S.C. 154(b) by 361 days.

(21) Appl. No.: 10/133,197

(22) Filed: Apr. 26, 2002

(65) Prior Publication Data

US 2002/0177530 A1 Nov. 28, 2002

(30) Foreign Application Priority Data

Apr. 26, 2001 (JP) ........................ 2001-128634

(51) Int. Cl.$^7$ ............................ C22B 9/02; B22D 27/02
(52) U.S. Cl. ................. 148/500; 148/505; 148/558; 75/10.67; 29/DIG. 95
(58) Field of Search ............... 75/10.67; 148/500, 148/505, 558; 29/DIG. 95; 204/155

(56) References Cited

U.S. PATENT DOCUMENTS

| 3,434,823 A | 3/1969 | Adamec ............... 75/10 |
| 4,244,796 A | 1/1981 | Rummel et al. ........ 204/140 |
| 6,579,490 B1 * | 6/2003 | Iwai et al. ............ 266/44 |

FOREIGN PATENT DOCUMENTS

| DE | 972 054 C | 5/1959 | |
| DE | 1 180 899 B | 5/1964 | |
| EP | 1 091 008 A1 | 4/2001 | ......... C22B/9/02 |
| JP | 06313685 A | 11/1994 | ......... F27D/19/00 |
| JP | 08090176 A | 4/1996 | ......... B22D/11/10 |
| JP | 2000054021 A | 2/2000 | ......... C21C/7/10 |
| JP | 2001321908 | 11/2001 | ......... B22D/11/115 |
| JP | 2002018559 | 1/2002 | ......... B22D/11/115 |

OTHER PUBLICATIONS

"Current advances in materials in processes," *Program of the 139$^{th}$ ISIJ Meeting* (Mar. 29–31, 2000), ISIJ, Japan, pp. 150–152.
A. Bojarevics, V. Bojarevics, Yu. Gelfgat, K. Pericleous, "Liquid metal turbulent flow dynamics in a cylindrical contrainer with free surface," *Magnetohydrodynamics*, vol. 35, No. 3, 1999, pp. 258–260.
Satoru Kawai, Qiang Wang, Kazuhido Iwai and Shigeo Asai, "Generation of Compression Waves by Simultaneously Imposing a Static Magnetic Field and an Alternating Current and Its Use for Refinement of Solidified Structure," *Materials Transactions*, vol. 42, No. 2, 2001, pp. 275–280.

\* cited by examiner

*Primary Examiner*—Mark Kopec
(74) *Attorney, Agent, or Firm*—Stoel Rives LLP

(57) ABSTRACT

A static magnetic field and a wave are applied to an electrically conductive fluid so as to satisfy the mathematical expression $$2\pi f < (\sigma/\rho)B^2,$$

where f is the frequency (Hz) of the applied wave, σ is the electrical conductivity (S/m) of the conductive fluid, ρ is the density (kg/m$^3$) of the conductive fluid, and B is the strength of the applied static magnetic field (T), to thereby generate and propagate vibratory motion into the conductive fluid.

8 Claims, 1 Drawing Sheet

METHOD FOR PROPAGATING VIBRATORY MOTION INTO A CONDUCTIVE FLUID AND USING THE METHOD TO SOLIDIFY A MELTED METAL

TECHNICAL FIELD

This invention relates to a method for propagating vibratory motion into a conductive fluid and using the method to perform a method for solidifying a melted metal.

BACKGROUND OF THE INVENTION

The solidification and refinement processes of a structure can be controlled effectively by imparting vibration into a melted liquid metal that is to be solidified. For example, it is well known that imparting mechanical impact to a supercooled liquid metal starts the solidification process. It is also well known that imparting vibration to a melted liquid metal creates a fine structure during solidification and applying a compression wave to a melted liquid metal promotes a degasifying process.

On a laboratory scale, it is relatively easy to impart vibratory motion to liquid metal by mechanically vibrating a vessel in which the liquid metal is charged. On a large industrial scale, however, it is difficult to mechanically vibrate the entire structure of a huge vessel. One technique currently used in large scale industrial applications entails, therefore, positioning a magnetostrictive oscillator or an electrostrictive oscillator in a liquid metal to impart a given amount of vibratory motion to the liquid metal. Another such technique entails introducing a compression wave generated by a speaker into a liquid metal to impart a given amount of vibratory motion to the liquid metal.

However, if such a magnetostrictive oscillator or an electrostrictive oscillator is employed, it may be melted or destroyed in and thereby contaminate the liquid metal. The amplitude of the vibration to be imparted is restricted because of oscillator output power level limitations. Moreover, if a compression wave is employed, it may be reflected almost entirely at the boundary between the liquid metal and the surrounding atmosphere and therefore not be imparted to the liquid metal because of an increase in the acoustic resistance between the liquid metal and the surrounding atmosphere. As a result, there is at present no method for propagating vibratory motion into a liquid metal suitable for particular use in large scale industrial applications.

SUMMARY OF THE INVENTION

An object of the present invention is to provide for use in large scale industrial applications a new method for propagating vibratory motion into a liquid metal.

To achieve the above object, this invention relates to a method for propagating vibratory motion into a conductive fluid and comprises the steps of:

preparing an electrically conductive fluid, and applying a static magnetic field and a wave to the conductive fluid so as to satisfy the following mathematical expression:

$$2\pi f < (\sigma/\rho)B^2, \qquad (1)$$

where f is the frequency (Hz) of the applied wave, $\sigma$ is the electrical conductivity (S/m) of the conductive fluid, $\rho$ is the density (kg/m$^3$) of the conductive fluid, and B is the strength of the applied static magnetic field (T), to thereby generate and propagate a given amount of vibratory motion into the conductive fluid.

The invention, which is the result of intense study by the inventors, achieves the above object by applying an electromagnetic force to a melted conductive fluid such as a liquid metal, instead of conventionally utilizing a mechanical vibration, an oscillator, or a speaker, to generate and propagate a given amount of vibratory motion in the conductive fluid.

The conventional wisdom of skilled persons is that only a compression wave can be propagated into a conductive fluid such as a liquid metal. On the other hand, the vibration originating from the electromagnetic force is a transverse wave. Therefore, the present invention includes generating and propagating the transverse wave in the conductive fluid to impart to it a given amount of vibratory motion.

Applying a static magnetic field of relatively large strength to a conductive fluid generates in it a magnetic field disturbance that propagates by convection. That is, if the conductive fluid is moved in response to the static magnetic field, an inductive current is generated and thus changes the distribution of the applied static magnetic field. In this case, the conductive fluid is moved in accordance with the magnetic flux lines associated with the fluid particles.

The inventors discovered that a transverse wave can be generated and propagated into the conductive fluid by applying to the conductive fluid the static magnetic field and a given wave under the above-mentioned condition so that a given requirement is satisfied. As a result, a given amount of vibratory motion can be generated and propagated in the conductive fluid by the electromagnetic force.

According to the method for propagating vibratory motion, an electromagnetic force originating from a static magnetic field and a wave generates vibration in a conductive fluid. The vibration can, therefore, be readily generated in the conductive fluid without use of a large-scale apparatus. As a consequence, the vibratory motion propagation method of the present invention can be preferably employed on a large industrial scale.

For example, the vibratory motion propagation method of the present invention can be preferably utilized to solidify a melted liquid metal. In this case, a given static magnetic field and a given wave are applied to the liquid metal during the solidification process so as to satisfy the above-requirement according to the present invention. In this case, the size of the solidification structure can be controlled without constraint, and thus, the solidification structure can be readily refined.

Additional aspects and advantages of this invention will be apparent from the following detailed description of preferred embodiments thereof, which proceeds with reference to the accompanying drawings.

DETAILED DESCRIPTION OF THE PREFERRED EMBODIMENTS

Figure 1:
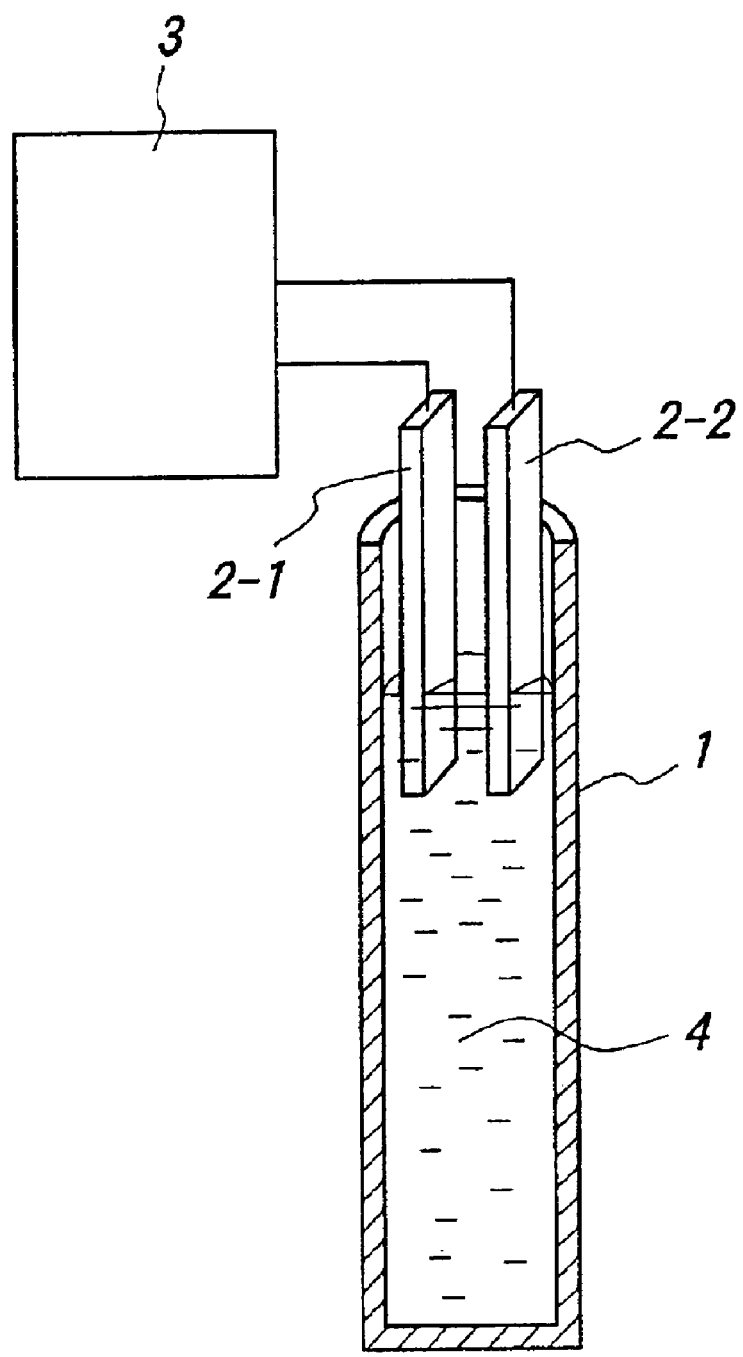
FIG. 1 is a schematic view showing an apparatus that is employed for solidifying a SnPb alloy according to the vibratory motion propagation method of the present invention.

This invention will be described in detail with reference to the accompanying drawing. In the present invention, a given static magnetic field and a given wave are applied to a conductive fluid so as to satisfy the above mathematical expression (1). If expression (1) is satisfied, the kind of wave and its frequency are not restricted. In a practical process such as the solidification of a liquid metal for which the electrical conductivity of the liquid metal is within a range of $10^5$–$10^7$ S/m and the density of the liquid metal is within a range of $10^3$–$10^4$ kg/m$^3$, expression (1) is satisfied by applying a static magnetic field having a strength within a range of several Tesla through several tens of Tesla and applying a wave having a frequency within a range of several hundred Hz through several thousand Hz.

In this case, the response to the applied static magnetic field is an amount of magnetic field disturbance that propagates by convection in the conductive fluid. The distribution of the magnetic field is determined by the convection. A given transverse wave is, therefore, generated and propagated in the conductive fluid, having originated from the magnetic force of the static magnetic field and the wave, as mentioned above. As a result, a given amount of vibratory motion originating from the transverse wave can be generated and propagated in the conductive fluid.

Such a static magnetic field can be generated from a superconductive magnet, and such a wave can be generated from an external AC power supply. In other words, an AC electric field produced from the external AC power supply can be utilized as the wave to be used in the present invention. In this way, the static magnetic field and the wave used in accordance with the present invention and satisfying expression (1) can be readily obtained from, respectively, the superconductive magnet and the external AC power supply.

The transverse wave generated in the conductive fluid when expression (1) is satisfied generally represents an Alfven wave. The Alfven wave is being intensely researched in astronomical physics and plasma engineering, but there is very little such research being done in the industrial field. The Alfven wave is, therefore, seldom ever utilized in the industrial field. The present invention is quite important also because of its industrial use of the Alfven wave.

The vibratory motion propagation method of the present invention can be employed in various industrial fields. Particularly, if the method is employed in solidifying a melted liquid metal, the process of solidification of the structure can be controlled freely and then refined. The method may also be employed in degasification, promotion of refining reaction, and control of solid-liquid interface configuration.

EXAMPLE

This example represents the application of the vibratory motion propagation method of the present invention for the purpose of solidifying a melted metal. In this example, an apparatus of the type shown in FIG. 1 was employed, and an alloy having a composition of Sn-10 mol % Pb (hereinafter, "SnPb alloy") was melted and then solidified. In the apparatus shown in FIG. 1, a cylindrical glass vessel 1 having an internal diameter of 30 mm and a height of 150 mm was employed, and Cu electrodes 2-1 and 2-2, each having a width of 10 mm and a thickness of 2 mm, were disposed in vessel 1 in spaced apart, face to face relation to each other. An external AC power supply 3 was connected to the ends of electrodes 2-1 and 2-2. Vessel 1 including electrodes 2-1 and 2-2 was placed in a superconductive magnet (not shown).

A melted SnPb alloy 4 filling vessel 1 to a depth of 120 mm was charged in vessel 1, and 20 mm of the length of each of electrodes 2-1 and 2-2 were immersed in the melted SnPb alloy 4. A static magnetic field of a strength of 10 T was applied from the superconductive magnet (not shown), and an AC electric field of frequency of 200 Hz and amplitude of 100 A was applied from external AC power supply 3 to the SnPb alloy 4. Since the electrical conductivity of SnPb alloy 4 was $10^6$–$10^7$ S/m and the density ρ of SnPb alloy 4 was about $10^4$ kg/m$^3$, the above expression (1) was satisfied in this example by the static magnetic field and the AC electric field specified above. Under these conditions, SnPb alloy 4 was solidified at a cooling rate of 0.1 K/sec.

Examination of the solidification structure of the solidified SnPb alloy revealed that the size of the solidification structure was less than or equal to about 1 mm at both of the upper and lower sides of vessel 1.

A sensor provided at the bottom portion of vessel 1 was used to measure the pressure of a wave propagating in the melted SnPn alloy. The pressure measured was almost in proportion to the current value of the AC electric field applied from external AC power supply 3. Therefore, during the above-described solidification process, an Alfven wave was generated in melted SnPb alloy 4. The inventors thus inferred that the Alfven wave propagated in melted SnPb alloy 4.

COMPARATIVE EXAMPLE

In this comparative example, melted SnPb alloy 4 was solidified in the same manner as described in the above Example, with the exception that the static magnetic field and the AC electric field were not applied and thus, a given wave, which was inferred as the Alfven wave, was not propagated. Examination of the solidification structure of the solidified SnPb alloy revealed that the size of the solidification structure was rough at both of the upper and lower sides of vessel 1. Particularly, at the lower side of vessel 1, the size of the solidification structure was enlarged up to about several mm.

Although the present invention was described in detail with reference to the above examples, this invention is not limited to the above disclosure and every kind of variation and modification may be made without departing from the scope of the present invention.

As mentioned above, by applying a static magnetic field and an electric field to a conductive fluid, according to the present invention, a vibration can be generated and propagated in the conductive fluid without a need for large scale and complicated apparatus. The vibratory motion propagation method of the present invention may, therefore, be employed in various industrial fields and, for example, preferably as a solidification structure controlling method for a melted liquid metal.

It will be obvious to those having skill in the art that many changes may be made to the details of the above-described embodiments of this invention without departing from the underlying principles thereof. The scope of the present invention should, therefore, be determined only by the following claims.

What is claimed is:

1. A method for propagating vibratory motion into a conductive fluid, comprising:

preparing an electrically conductive fluid; and applying a static magnetic field and a wave to the conductive fluid the static magnetic field and the wave generation a transverse wave that propagates through the conductive fluid and thereby imparts to it an amount of vibratory motion, and the static magnetic field and the wave satisfying the expression $$2\pi f < (\sigma/\rho)B^2,$$

where f is the frequency (Hz) of the applied wave, σ is the electrical conductivity (S/m) of the conductive fluid, ρ is the density (kg/m³) of the conductive fluid, and B is the strength of the applied static magnetic field (T).

2. The propagating method of claim 1, in which the wave applied to the conductive fluid includes an AC electric field produced from an external AC power supply.

3. The propagating method of claim 1, in which the applied static magnetic field generates a magnetic field disturbance that propagates by convection in the conductive fluid.

4. The propagating method of claim 3, in which an Alfven wave is generated and propagated in the conductive fluid.

5. A method for solidifying a melted metal, comprising:
preparing a melted metal; and
applying a static magnetic field and a wave to the melted metal, the static magnetic field and the wave generating a transverse wave that propagates through the melted metal and thereby imparts to it an amount of vibratory motion, and the static magnetic field and the wave satisfying the expression $$2\pi f < (\sigma/\rho)B^2,$$

where f is the frequency (Hz) of the applied wave, σ is the electrical conductivity (S/m) of the conductive fluid, ρ is the density (kg/m³) of the conductive fluid, and B is the strength of the applied static magnetic field (T), to solidify the melted metal.

6. The solidifying method of claim 5, in which the wave applied to the melted metal includes an AC electric field produced from an external AC power supply.

7. The solidifying method of claim 5, in which the applied static magnetic field generates a magnetic field disturbance that propagates by convection in the melted metal.

8. The solidifying method of claim 7, in which an Alfven wave is generated and propagated in the melted metal.

* * * * *